N. O'Neil,
Straw Cutter.
No. 104,342.
Patented June 14, 1870.

Witnesses:
S. S. Mabee
Alex. F. Roberts

Inventor:
N. O'Neil
per Munn & Co
Attorneys.

United States Patent Office.

NELSON O'NEIL, OF PURCHASE LINE, ASSIGNOR TO HIMSELF AND EDWARD O'NEIL, JR., OF MITCHELL'S LANDING, PENNSYLVANIA.

Letters Patent No. 104,342, dated June 14, 1870.

IMPROVEMENT IN STRAW-CUTTERS.

The Schedule referred to in these Letters Patent and making part of the same.

*To all whom it may concern:*

Be it known that I, NELSON O'NEIL, of Purchase Line, in the county of Indiana and State of Pennsylvania, have invented a new and useful Improvement in Straw-Cutters; and I do hereby declare that the following is a full, clear, and exact description thereof, which will enable others skilled in the art to make and use the same, reference being had to the accompanying drawing forming part of this specification.

The object of this invention is to furnish a machine for cutting straw and other similar material for feed, which machine shall be cheap, durable, and convenient; and It consists in the arrangement for changing or varying the length of the feed cut, as will be hereinafter more fully described.

In the drawing—

Similar letters of reference indicate corresponding parts.

Figure 1:
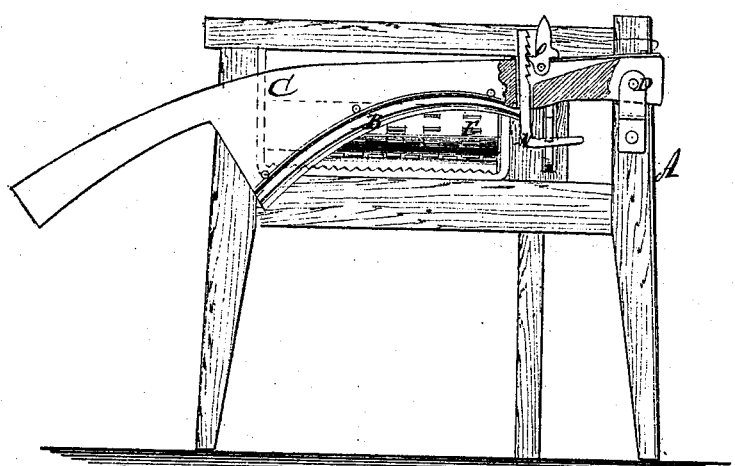
Figure 1 represents a view of the front end of the machine, showing the knife, a portion of the upper feed-roller, and the mode of operating the pawl-lever by means of which the feed is given.
Figure 2:
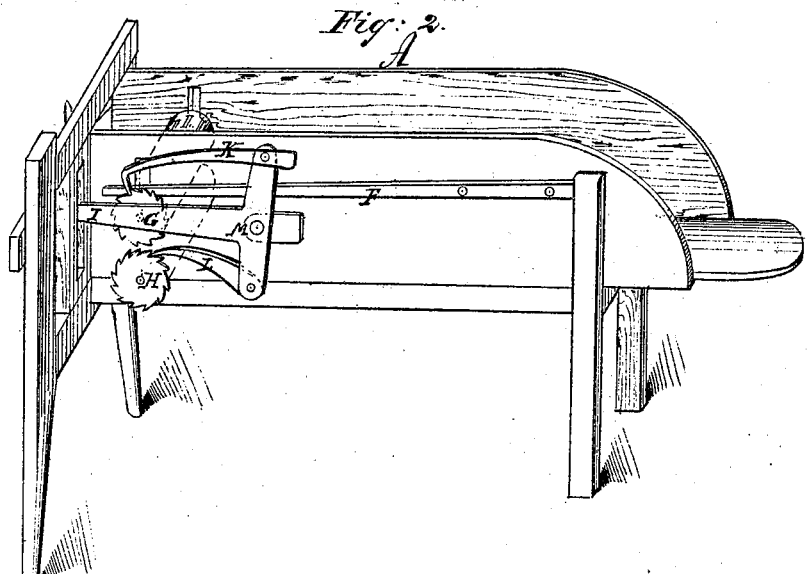
Figure 2 is a perspective side view, showing the pawl-lever and the pawls, and the manner in which the pawls operate upon the feed-rollers.

A is the cutter-box, which is of the usual form and size.

B is the knife or cutting-edge on the lever C, which lever has its fulcrum at the point D.

E is the upper feed-roller, the journals of which work in vertical slots in the sides of the box.

Each journal is forced downward by a spring, F, with a constant pressure, and on one journal there is a ratchet-wheel, G.

The lower feed-roller is only allowed a revolving motion, and has a ratchet-wheel, H, on one of its journals.

I is the pawl-lever, which is in the form of a cross in a horizontal position.

To the arms of the cross, pawls K and L are attached, one of which pulls and the other pushes, in feeeding, as seen in the drawing.

The fulcrum of the pawl-lever is at M.

The outer end of the lever passes through the front end of the frame, and works the pawls so as to give the desired feed when it is raised.

N is a hook, made adjustable in the cutter-lever C, as seen, by means of the catch O. The end of the pawl-lever projects between this hook and the lower edge of the cutter-lever, so that, in raising the hook, the end of the pawl-lever is raised, which gives the feed.

When the knife descends the pawl-lever is forced down, which gives the pawls a new hold upon the ratchets.

The distance between the hooks N and the under edge of the lever C governs the length of the feed. The pawl-lever is moved more or less, as the hook is raised or lowered.

This arrangement gives a positive motion for the feed, and the length of cut is varied in the most simple and effective manner.

This is a very simple, cheap, and durable machine, and its advantages over more complicated and expensive straw-cutters will be apparent to all.

Having thus described my invention,

I claim as new and desire to secure by Letters Patent—

1. The adjustable hook N, in combination with the cutter-lever of a straw-cutter, substantially as and for the purposes described.

2. The cross or pawl-lever I, in combination with the hook N and pawls K L, arranged and operating substantially as and for the purposes herein shown and described.

NELSON O'NEIL.

Witnesses:
S. L. LOWRY,
WILLIAM A. BROWN.